UNITED STATES PATENT OFFICE.

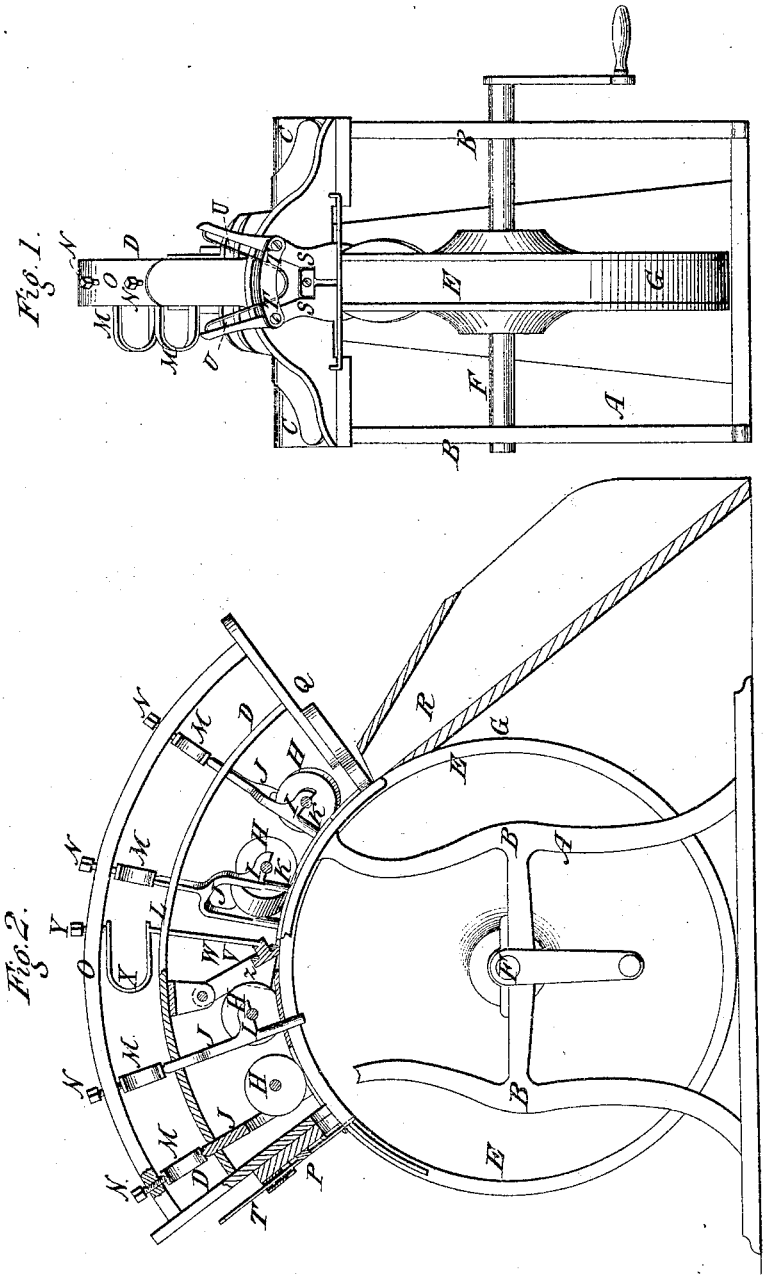

GEORGE S. ANDERSON, OF JEFFERSONVILLE, INDIANA.

MACHINE FOR PEELING WILLOW.

Specification forming part of Letters Patent No. 58,747, dated October 16, 1866.

*To all whom it may concern:*

Be it known that I, GEORGE S. ANDERSON, of Jeffersonville, in the county of Clark and State of Indiana, have invented new and useful Improvements in Machines for Peeling Willow; and I do hereby declare that the following is a full, clear, and exact description thereof, which will enable others skilled in the art to make and use the same, reference being had to the accompanying drawings, forming part of this specification.

The present invention relates to a machine for the peeling of willow, whereby it can be peeled without the least injury, and in a most expeditious, perfect, and practical manner.

In the accompanying plate of drawings, my improvements in machines for peeling willow are illustrated, Figure 1 being a view of the front end of the machine, and Fig. 2 a side elevation, with some portions in vertical section, to more fully show its construction and arrangement of its parts.

Similar letters of reference indicate like parts.

A in the drawings represents the framework of the machine, which consists, principally, of two parallel upright frames, B, over and across the upper ends of which extends a convex top, C, open in its center and connected by a frame, D, which carries a series of friction-rollers, &c., to be hereinafter referred to and described.

E is a wheel, hung by its center shaft, F, between the two upright frames B, and in bearings of each of the same, which wheel is arranged in a vertical plane, and at its upper side projects above and through the center opening of the convex top. The periphery of this wheel is covered with rubber, G, or any other suitable elastic and yielding material.

H H are a series of friction-rollers, arranged above the wheel E, and bearing on the upper portion of its periphery. These wheels are hung in bearings of arms I, projecting from upright open frames J, that, by their ends K, play through the convex top C and the circular or arc-shaped rail L above the convex top and concentric therewith.

Against the upper ends of the frames J bent springs M, at one end, bear, the other ends being acted upon by set-screws N, arranged in the outer curved or arc-shaped bar O, concentric with the convex top C. These rollers H are covered with rubber or other suitable elastic material, and between them and the elastic periphery of the wheel E the willow which is to be peeled passes from the end of the machine marked P in the drawings to the opposite end, (marked Q,) where, through the vertically-inclined spout R, it is delivered. At the end of the machine where the willow enters it two similar brake-jaws, S S, are hung upon centers, which jaws are arranged so as to open from each other, and by the action of a common bow or bent spring, U, are held closed upon each other. These jaws S S extend over the sides of the wheel, and between them the willow has to pass to the wheel E, so that by the action of the bow-spring U they are made to act upon and thus strip the willow.

Between the first and last two rollers of the series of rollers H, a brake, V, is hung so as to bear upon the periphery of the wheel, which brake-frame, through a rod, W, is acted upon by a bent or bow spring, X, arranged between the two arc-shaped bars, that, by means of a set or thumb screw, Y, can be adjusted to any desired degree of tension. This brake is provided with side flanges, Z Z, that serve as guides to the willow passing through the machine.

From the above description of my improved machine it is plainly apparent that willow can be stripped in a most perfect, practical, and expeditious manner, and without the least injury to the same—a result of the utmost importance and advantage.

I claim as new and desire to secure by Letters Patent—

The wheel E, rollers H, brakes S and V, when constructed, combined, and arranged to operate together substantially in the manner and for the purpose specified.

GEORGE S. ANDERSON.

Witnesses:
LEWIS FOSSEE,
THOS. N. DAVEY.